Figure 1:
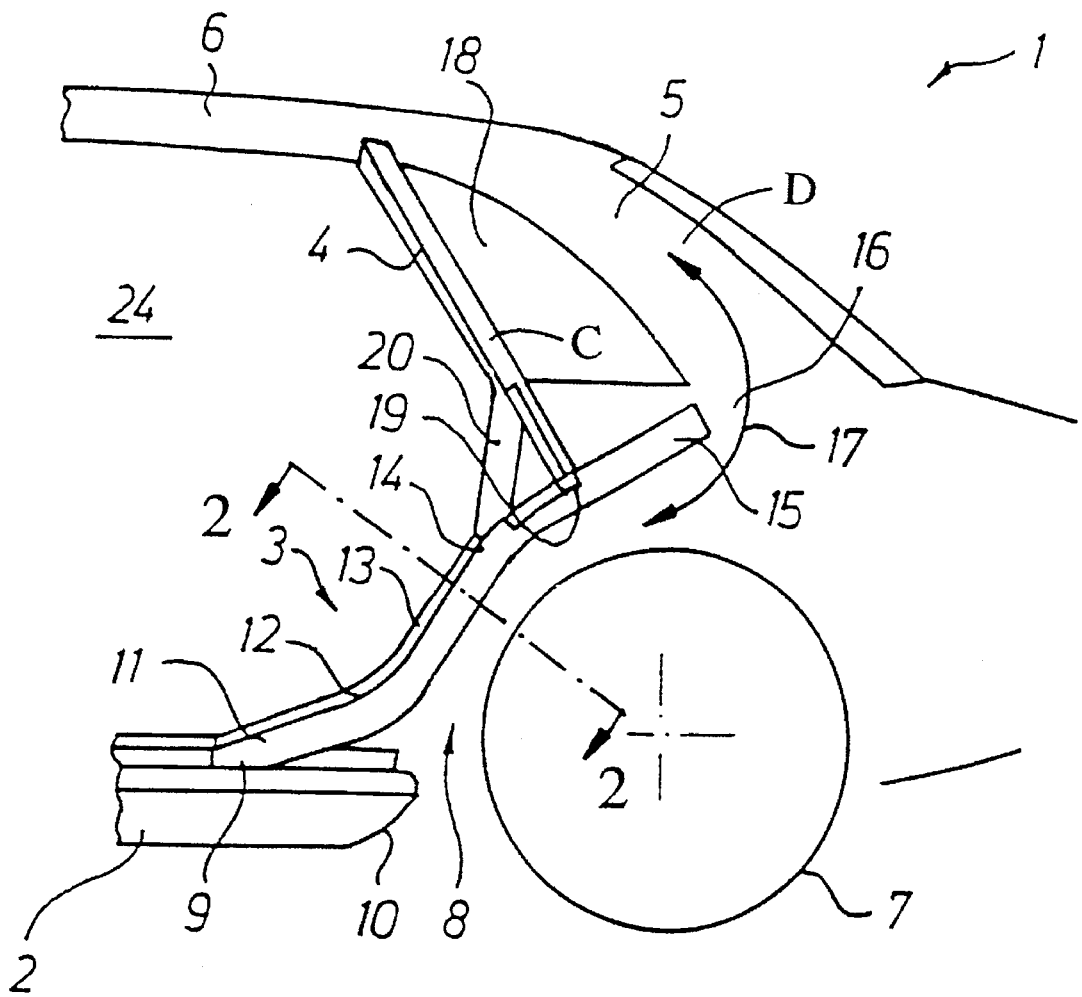

United States Patent [19]

Enning et al.

[11] Patent Number: 5,645,312
[45] Date of Patent: Jul. 8, 1997

[54] SUPPORTING STRUCTURE OF A BODY OF A PASSENGER CAR

[75] Inventors: Norbert Enning, Denkendorf; Heinrich Timm, Ingolstadt, both of Germany

[73] Assignee: Audi AG, Ingolstadt, Germany

[21] Appl. No.: 119,241

[22] PCT Filed: Mar. 13, 1992

[86] PCT No.: PCT/EP92/00554

§ 371 Date: Sep. 24, 1993

§ 102(e) Date: Sep. 24, 1993

[87] PCT Pub. No.: WO92/18369

PCT Pub. Date: Oct. 29, 1992

[30] Foreign Application Priority Data

Apr. 19, 1991 [DE] Germany ............ 41 12 814.1

[51] Int. Cl.$^6$ .................................................. B62D 23/00
[52] U.S. Cl. ..................... 296/203; 296/195; 296/198; 296/209
[58] Field of Search ............................. 296/195, 203, 296/205, 198, 209

[56] References Cited

U.S. PATENT DOCUMENTS

| | | | |
|---|---|---|---|
| 2,986,423 | 5/1961 | Barenyi | 296/203 |
| 3,073,647 | 1/1963 | Beltz | |
| 3,528,699 | 9/1970 | Wessells | |
| 4,304,434 | 12/1981 | Suzuki et al. | 296/195 |
| 4,462,632 | 7/1984 | Grassi, Jr. | |

FOREIGN PATENT DOCUMENTS

| | | |
|---|---|---|
| 146716 | 10/1984 | European Pat. Off. |
| 3343682 | 6/1984 | Germany |
| 0527068 | 10/1940 | United Kingdom |

*Primary Examiner*—Dennis H. Pedder
*Attorney, Agent, or Firm*—George W. Finch

[57] ABSTRACT

A rear support structure for the coachwork of a passenger vehicle having closed loop interconnected frame members including a longitudinally extending bottom sill connected at its rearward portion to the forward portion of a rear wheel housing carrier member. The rearward portion of the rear wheel housing carrier member is connected to at least one roof support post which in turn is connected to the roof structure. The connection of the sill to the rear wheel housing carrier member is at a low angle, providing resistance to mechanical fatigue due to flexing and vibration, while at the same time providing a rear passenger door cutout of sufficient size to permit easy entry and egress of rear passengers. The rear wheel housing carrier member has at least two, approximately linear regions, one arcuately flowing into the other for connection of the vehicle's floor structure and two roof support posts of the vehicle bodywork. In the preferred embodiment, the rear wheel carrier member has three approximately linear regions joined by two intermediate arcuate sections. The interconnection of the bottom sill, the rear wheel carrier member, the roof support post, and the roof structure provides a rigid rear bearing structure having a continuous force flux pathway, which dissipates the energy of a side collision thus protecting passengers in the event of such a collision with the rear passenger compartment.

8 Claims, 1 Drawing Sheet

SUPPORTING STRUCTURE OF A BODY OF A PASSENGER CAR

The invention relates to a supporting structure of a body of a passenger car.

A known and conventional supporting structure of a body of a passenger car comprises a floor structure with a respective sill which extends in the longitudinal direction on the vehicle side and which a rear wheel housing respectively adjoins towards the rear side of the vehicle. At least one post is used as a connection from the body region above the wheel housing to the roof structure. When a rear, lateral and fixed triangular window is contained in the body, a front post C and a rear post D are used on both sides of this window.

It is further known (German Offenlegungsschrift 3,343, 682) to use a wheel-housing carrier as a connection between the sill and the associated post, for example the post C. Such a wheel-housing carrier extends in an arc at least partially around the wheel housing and comes with one end up against the rear sill end approximately vertically from above. The rear door cutout is consequently open very wide and is limited in the lower region by the sill only. This large orifice in the supporting structure constitutes a weak point for a side collision. In addition, it must be remembered that, in the conventional construction with a contraction of the side member between the wheel housing, back-seat bench and axle fastening point, the so-called "dog leg", there is, in any event, a weak point in terms of body rigidity which presents problems.

Moreover, in conventional constructions, the post D terminates in the sheet-metal arch of the upper wheel housing, with the result that a force-flux gap of the side frame between the sill and the post D occurs.

Conventional self-supporting vehicle bodies for passenger cars, including the supporting structure, are produced from sheet-metal parts. Carriers with hollow profiles are each produced from at least two metal sheets welded to one another. The steel sheets used for constructing such bodies are shaped by the deep-drawing process. The press dies for shaping the metal sheets are relatively expensive, but allow high quantities, and therefore a cost-effective solution is available for large-series production. However, in view of the high investment in dies, the process described is highly cost-intensive for small series.

It is therefore known (EP 0,146,716 B1), especially for small series, to produce vehicle bodies for passenger cars with a supporting structure consisting of hollow profiles which are connected to one another by means of junction elements. The hollow profiles are designed as extruded light-metal profiles and the junction elements as light-metal castings. In addition to a more cost-effective solution for small series, such a construction advantageously also achieves lower body weights and improvements in corrosion protection. A supporting structure of a body of a passenger car is shown here, with a floor structure having a sill extending respectively in the longitudinal direction on the vehicle side, with an adjoining respective rear wheel housing, with a post C and a post D for connecting the region above a wheel housing to the roof structure, and with a wheel-housing carrier as a connection between the sill 2 and the posts C and D. Here, the wheel-housing carrier is connected at a connection point in front of the rear end of the sill or at a distance from the wheel housing and therefore towards the middle of the lower door cutout and the sill. Starting from this connection point, the wheel-housing carrier ascends rearwards and upwards at a low angle with a first, lower carrier region. The wheel-housing carrier then subsequently bends upwards in an arc into a more vertical direction with a second carrier region and in this region bears against the rear wheel housing.

The object of the invention is to develop a supporting structure, of the generic type, of a body of a passenger car, so that the body rigidity and the side-collision behaviour in the region of the rear door cutout are improved by a new rear body structure.

According to Claim 1, after the second carrier region, the wheel-housing carrier bends obliquely upwards and rearwards again in a second arc into a more horizontal direction with a third, upper carrier region. A suitable angle of ascent between the sill and the first carrier region is approximately 20°, between the sill and the second carrier region approximately 60° and between the sill and the third carrier region approximately 30°. A simple connection with high body rigidity to the roof region is possible by means of this design of the wheel-housing carrier. For this purpose, the post C is supported on the third carrier region after the second arc and is connected there. The wheel-housing carrier is guided as far as the root of the post D and is connected to the post D. The force-flux gap, present in conventional constructions, of the side frame between the sill and the post D is thereby closed. Forces, especially forces occurring during a collision, are consequently distributed more effectively, even intercepted via the post D and partially guided into the roof structure. The wheel-housing carrier is designed as an extruded light-metal profile with a closed hollow-profile cross-section. Adjacent carriers can also likewise be designed as extruded light-metal profiles. Such extruded light-metal profiles are cheap to produce and, by a constructive design of the profile over the wall thickness and the profile cross-section, can be matched to the requirements as regards rigidity and collision behaviour.

If, as is customary, the post C extends obliquely, this produces between the wheel-housing carrier and the post C a triangle, into which, a lock-bolt receptacle for the door lock can advantageously be inserted. This lock-bolt receptacle can be designed as a stable part, for example as a casting, and contributes to a further reinforcement of this region and therefore to an increase in safety in the event of a side collision.

An advantageous connection of the wheel-housing carrier to the post D is proposed by Claim 4, the wheel-housing carrier being embedded in the composite wheel-housing structure internally and externally and is surrounded on its upper carrier region by the wheel housing externally and internally, this constituting the downward extension of the post D. This affords a stable composite structure, to which further side parts can also be connected.

The invention together with further particulars, features and advantages is explained in more detail by means of a drawing.

In this

Figure 2:
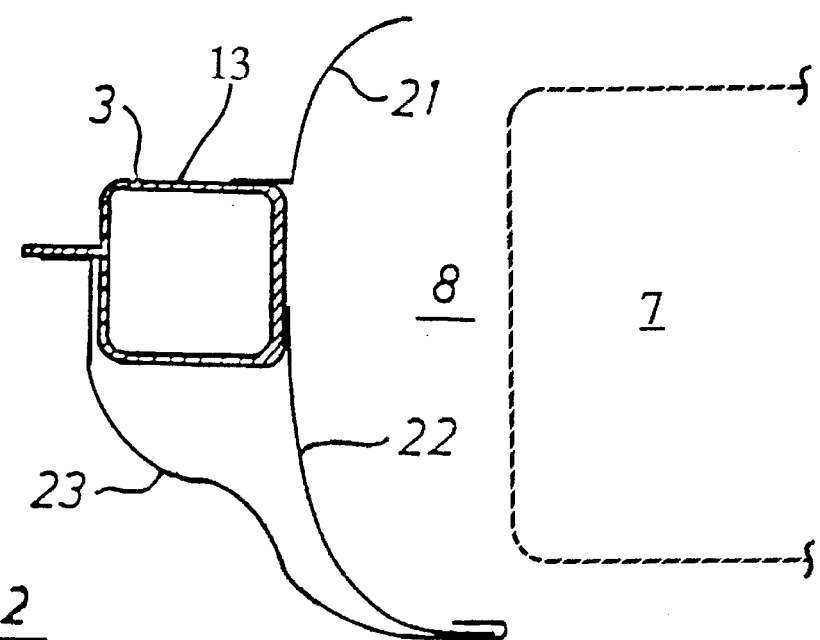

FIG. 1 shows a side view of the supporting structure of a body of a passenger car in the region of the rear door cutout, and FIG. 2 shows a section through a wheel-housing carrier along the line 2—2 of FIG. 1.

FIG. 1 illustrates part of a body 1 of a passenger car in the region of a rear door cutout 24, with part of the supporting structure consisting of a sill 2, a wheel-housing carrier 3, a post C (4) and a post D (5). The post C (4) and the post D (5) merge into the roof structure 6.

Shown diagrammatically, furthermore, is a vehicle wheel 7, around the upper region of which extends the wheel housing 8 known per se (but not shown for the sake of clarity).

The wheel-housing carrier 3 is attached to the sill 2 at a connection point 9 which is located in front of the rear end 10 of the sill 2 or at a distance from the wheel housing 8 towards the middle of the door cutout 24.

The wheel-housing carrier 3 ascends from this connection point 9 obliquely rearwards and upwards at a low angle of 20° with a first, lower carrier region 11.

Approximately above the rear sill end 10, the wheel-housing carrier 3 then bends upwards in an arc 12 into a more vertical direction at an angle of ascent (relative to the sill 2) of approximately 60°, to form a middle, second carrier region 13. In this region, the wheel-housing carrier 3 bears against the wheel housing 8 or forms the limitation of the latter, as explained in more detail further below in the section according to FIG. 2.

After the middle, second carrier region 13, the wheel-housing carrier 3 bends in a second arc 14 again into a more horizontal direction at an angle of ascent relative to the sill 2 of approximately 30°, to form a third, upper carrier region 15. The wheel-housing carrier 3 thus has, as a whole, a flat S-shape.

The upper, third carrier region 13 extends as far as the root 16 of the post D (5) and is connected to the latter there. The connection can be designed in such a way that the wheel-housing carrier 3 is held in a double-walled construction of the post D (5). As a result of the design of the wheel-housing carrier 3 as far as the post D (5), in particular an otherwise customary force-flux gap of the side frame between the sill 2 and the post D (5) is closed, this being indicated diagrammatically by the double arrow 17.

A rear triangular window 18 is located between the post D (5) and the post C (4) attached further forwards and extending obliquely. The post C (4) is supported with its lower end at a connection point 19 on the third carrier region 15 after the arc 14. A lock-bolt receptacle 20 is mounted in the triangle between the post C (4) and the upper, third carrier region 15. The arrangement of the post C (4) on the wheel-housing carrier 3 in conjunction with a solid lock-bolt receptacle and the connection to the post D (5) result, in this region, in a highly stable construction and composite carrier structure.

As a result of the smooth run of the wheel-housing carrier 3 with its lower carrier region 11 into the sill 2 in front of the sill end 10, the rigidity is increased as a whole in the region of the rear door cutout 24. In particular, the protection of the occupants in the event of a side collision is improved, the wheel-housing carrier 3 acting as a safety carrier.

FIG. 2 shows a cross-section through the wheel-housing carrier 3 in the region of the wheel housing 8 along the line 2—2 of FIG. 1.

The wheel-housing carrier 3 has a closed hollow-profile cross-section and is designed as an extruded aluminium profile. The wheel-housing carrier 3 is embedded here between a wheel-housing internal panel 21 and a wheel-housing external panel 22. The wheel-housing carrier 3 here thus forms partially the limitation of the wheel housing. The panels 21 and 22 shown constitute the downward extension of the post D (5) towards the wheel housing 8.

Furthermore, a side part 23 is connected as a door cheek to the wheel-housing carrier 3 and makes the connection with the outside of the wheel housing.

Thus, along with a simple construction, the proposed design of a wheel-housing carrier improves the body rigidity in the region of the rear door cutout 24 and of the rear wheel housing 8 and the collision behaviour.

We claim:

1. A rear supporting structure for the body of a passenger vehicle comprising in operative combination,
    a) a bottom sill member extending in a longitudinal direction on the vehicle side, said sill member having a forward end and a rearward end and having joined thereto a composite rear wheel housing, said composite rear wheel housing having an inner panel and an outer panel;
    b) a rear wheel housing carrier member having a first forward end and a second rearward end, said first forward end of said carrier member in rigid and secure connection to said sill member at a point forward of said rearward end of said sill member, said carrier member comprising,
        i) a plurality of straight sections joined by at least one intermediate arcuate section;
        ii) a first of said straight sections defining a lower carrier region extending obliquely upwardly and rearwardly at a first angle above the horizontal from said connection with said sill member,
        iii) a second of said straight sections defining an intermediate carrier region extending upwardly and rearwardly at a second angle above the horizontal, said second straight section joined to said first straight section by a first arcuate section comprising at least one of said arcuate sections,
        iv) said first arcuate section joining being disposed above said rearward end of said sill, said second straight section connected to the rear wheel housing and defining the forward edge of said rear wheel housing;
    c) a roof structure;
    d) a first forward roof support post having a first root end and a second roof end, said root end is rigidly connected to said wheel-housing carrier member and said second roof end is rigidly connected to said roof structure.

2. A rear supporting structure for the body of a passenger vehicle as in claim 1 further comprising a third of said straight sections of said rear wheel-housing carrier member, said third straight section being located rearward of the said second carrier region and extending upwardly and rearwardly at a third angle above the horizontal, said third straight section joined to said second straight section by a second arcuate section comprising at least one of said arcuate sections.

3. A rear supporting structure for the body of a passenger vehicle as in claim 2 wherein said first angle of said first straight section is approximately 20° relative to said sill, said second angle of said second straight section is approximately 60° relative to said sill, and said third angle of said third straight section is approximately 30° relative to said sill.

4. A rear supporting structure for the body of a passenger vehicle as in claim 3 wherein said roof support post is supported on and rigidly connected to said third straight section of said rear wheel-housing carrier member.

5. A rear supporting structure for the body of a passenger vehicle as in claim 4 further comprising a lock-bolt bracing member, said bracing member rigidly positioned between said first forward post and said rear wheel-housing carrier member and spanning an acute angle formed between said first forward roof support post and said rear wheel carrier member.

6. A rear supporting structure for the body of a passenger vehicle as in claim 5 further comprising a second rearward roof support post, said second support post having a first root end rigidly connected to said second rearward end of said rear wheel-housing carrier member, and a second roof end rigidly connected to said roof structure.

7. The rear supporting structure for the body of a passenger vehicle as in claim 1 wherein said rear wheelhousing carrier member has a closed hollow-profile cross-section and is an extrusion.

8. The rear supporting structure for the body of a passenger vehicle as in claim 7 wherein said rear wheel-housing carrier member extrusion is constructed from aluminum.

* * * * *